United States Patent
Katayama et al.

(10) Patent No.: US 8,563,667 B2
(45) Date of Patent: Oct. 22, 2013

(54) COMPOSITION FOR THERMOSETTING SILICONE RESIN

(75) Inventors: Hiroyuki Katayama, Osaka (JP); Ryuichi Kimura, Osaka (JP)

(73) Assignee: Nitto Denko Corporation, Osaka (JP)

( * ) Notice: Subject to any disclaimer, the term of this patent is extended or adjusted under 35 U.S.C. 154(b) by 59 days.

(21) Appl. No.: 12/861,064

(22) Filed: Aug. 23, 2010

(65) Prior Publication Data

US 2011/0046320 A1    Feb. 24, 2011

(30) Foreign Application Priority Data

Aug. 24, 2009   (JP) ................. 2009-193103

(51) Int. Cl.
*C08F 283/12*    (2006.01)
*C08G 77/16*    (2006.01)

(52) U.S. Cl.
USPC .......................................... 525/477; 525/474

(58) Field of Classification Search
USPC ................................. 525/477, 474
See application file for complete search history.

(56) References Cited

U.S. PATENT DOCUMENTS

| | | | | |
|---|---|---|---|---|
| 4,587,288 A * | 5/1986 | Maxson et al. | ............... | 524/425 |
| 6,046,283 A * | 4/2000 | Katsoulis et al. | ............ | 525/477 |
| 8,030,429 B2 * | 10/2011 | Sugiura et al. | .................. | 528/21 |
| 8,076,411 B2 * | 12/2011 | Maton et al. | ................... | 524/837 |
| 8,298,367 B2 * | 10/2012 | Beger et al. | .................... | 156/325 |
| 2006/0264133 A1 * | 11/2006 | Krajewski et al. | ............ | 442/104 |
| 2008/0251200 A1 | 10/2008 | Kimura et al. | | |
| 2008/0300358 A1 * | 12/2008 | Cook et al. | ..................... | 524/588 |
| 2009/0294023 A1 * | 12/2009 | Beger et al. | .................... | 156/106 |
| 2010/0209670 A1 * | 8/2010 | Suehiro et al. | ............... | 428/161 |
| 2010/0225010 A1 * | 9/2010 | Katayama | .................... | 257/791 |
| 2011/0160409 A1 * | 6/2011 | Yamamoto | ................... | 525/477 |
| 2011/0210371 A1 * | 9/2011 | Kimura et al. | ................ | 257/100 |
| 2011/0260209 A1 * | 10/2011 | Katayama | ..................... | 257/100 |
| 2011/0301276 A1 * | 12/2011 | Katayama et al. | ........... | 524/493 |

FOREIGN PATENT DOCUMENTS

| | | |
|---|---|---|
| CN | 101348612 A | 1/2009 |
| EP | 2 196 503 A1 | 6/2010 |
| JP | 3852465 B2 | 11/2006 |
| JP | 2007-273998 A | 10/2007 |
| JP | 2007-311401 A | 11/2007 |
| WO | WO 2006106362 A1 * | 10/2006 |
| WO | 2007/009871 A2 | 1/2007 |
| WO | WO 2007011538 A2 * | 1/2007 |

OTHER PUBLICATIONS

Tomanek, Andreas. Silicones and Industry: A compendium for practical use, instruction and reference. Evidentiary reference.*
Communication issued on Dec. 7, 2011 by the European Patent Office in the corresponding European Patent Applicaiton No. 10173566.0.
European Search Report, dated Oct. 8, 2010, issued in Application No. 10173566.0.
Communication issued Aug. 16, 2013, by the Sate Intellectual Property Office of P. R. China; in corresponding Application No. 201010267340.2.

* cited by examiner

*Primary Examiner* — Mike M Dollinger
(74) *Attorney, Agent, or Firm* — Sughrue Mion, PLLC

(57) ABSTRACT

The present invention relates to a composition for thermosetting silicone resin including: (1) a dual-end silanol type silicone resin represented by formula (I) in which $R^1$ represents a monovalent hydrocarbon group, and n is an integer of 20 to 10,000, provided that all $R^1$ groups may be the same or different; (2) a trialkoxysilane; and (3) a condensation catalyst.

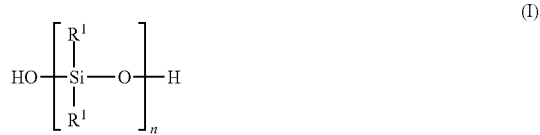

(I)

2 Claims, No Drawings

COMPOSITION FOR THERMOSETTING SILICONE RESIN

FIELD OF THE INVENTION

The present invention relates to a composition for thermosetting silicone resin. More particularly, the invention relates to a composition for thermosetting silicone resin, having excellent storage stability in a semi-cured state, and having excellent transparency, heat resistance and adhesiveness; and an adhesive sheet as a molded body of the composition.

BACKGROUND OF THE INVENTION

In high-power white LED devices whose application to generic illumination has been studied, adhesives having excellent transparency and heat resistance have been used in various applications. For example, patent document 1 discloses an adhesive for fixing a translucent support and an LED chip to each other, and the adhesive is composed of an epoxy resin, a silicone resin, water glass or the like.

Further, in patent document 2, when a phosphor plate is arranged on an LED, an adhesive prepared from a material such as silicone, low-melting glass or a transparent adhesive, is used. In patent document 3, a substrate for an LED chip and a light reflection layer formed on a base table are adhered to each other with a silicone-based adhesive.

Patent Document 1: Japanese Patent No. 3852465
Patent Document 2: JP-A-2007-273998
Patent Document 3: JP-A-2007-311401

SUMMARY OF THE INVENTION

However, the adhesives which have been conventionally used are not sufficiently satisfactory yet. That is to say, the epoxy resins are liable to be deteriorated by heat generation of the LED chip to cause discoloration, and the use thereof is liable to causes a decrease in light flux. Although the silicone resins have excellent heat discoloration resistance, pyrolysis accompanied by the occurrence of cyclic siloxane is liable to occur under conditions of 200° C. or more, thereby causing a problem of contamination in the vicinity of a device. Further, the glass has excellent heat discoloration resistance and pyrolysis resistance, but has high softening point, and moreover has hard and brittle properties. The glass is therefore poor in processability and crack resistance.

An object of the invention is to provide a composition for thermosetting silicone resin, having excellent storage stability in a semi-cured state, and having excellent transparency, heat resistance and adhesiveness; and an adhesive sheet as a molded body of the composition.

Namely, the present invention relates to the following items 1 to 4.

1. A composition for thermosetting silicone resin including:
   (1) a dual-end silanol type silicone resin represented by formula (I):

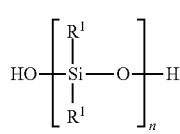

in which $R^1$ represents a monovalent hydrocarbon group, and n is an integer of 20 to 10,000, provided that all $R^1$ groups may be the same or different;
   (2) a trialkoxysilane; and
   (3) a condensation catalyst.

2. The composition for thermosetting silicone resin according item 1, in which the (2) trialkoxysilane is a compound represented by formula (II):

$$R^2\text{---}Si(X^1)_3 \quad\quad (II)$$

in which $R^2$ represents a monovalent organic group, and $X^1$ represents an alkoxy group, provided that three $X^1$ groups may be the same or different.

3. The composition for thermosetting silicone resin according to item 1 or 2, in which the (3) condensation catalyst includes tetramethylammonium hydroxide.

4. A silicone adhesive sheet formed by applying the composition for thermosetting silicone resin according to any one of items 1 to 3 onto a substrate, followed by drying.

The composition for thermosetting silicone resin of the invention achieves an excellent effect of being able to provide a silicone resin having excellent storage stability in a semi-cured state and having excellent transparency, heat resistance and adhesiveness.

DETAILED DESCRIPTION OF THE INVENTION

The composition for thermosetting silicone resin of the invention is significantly characterized in that the composition includes components resinified by a condensation reaction, specifically (1) a dual-end silanol type silicone resin, (2) a trialkoxysilane and (3) a condensation catalyst, and that the (1) dual-end silanol type silicone resin is a compound represented by formula (I):

in which $R^1$ represents a monovalent hydrocarbon group, and n is an integer of 20 to 10,000, provided that all $R^1$ groups may be the same or different.

Functional groups relating to the condensation reaction in the composition of the invention are a silanol group of the (1) dual-end silanol type silicone resin and an alkoxysilyl group of the (2) trialkoxysilane. In these functional groups, a siloxane structure ($\text{---}(SiR^1{}_2O)_n\text{---}$) as a basic skeleton of formula (I) has a specific length, so that the existing ratio (density) thereof in the composition becomes low. Further, the reactivity of a hydroxy group is low due to steric hindrance of $R^1$ in formula (I). Accordingly, the composition of the invention can form a stable semi-cured state, so that it adheres well to an adherend in such a state, and thereafter is completely cured, thereby obtaining a so-called curing type adhesive. Furthermore, as described above, the reactivity of a hydroxy group is low due to steric hindrance of $R^1$ in formula (I), so that the composition also becomes excellent in storage stability in the semi-cured state. Incidentally, in this specification, the semi-cured state (stage B) means a state between stage A where the composition is soluble in a solvent and stage C where the composition is completely cured, and a state where curing or gelation has somewhat proceeded, and where the composition is swelled but is not completely dissolved in a solvent, and is softened but is not melted by heating. The completely cured state means a state where curing or gelation has completely proceeded.

Further, in the trialkoxysilane, a by-product of the condensation reaction is an alcohol, which has a little effect on pyrolysis of the silicone resin. Furthermore, when the boiling point of the by-product is low, it is easily removed from the resin.

Still further, the siloxane skeleton has no absorption in a visible light region, so that the composition also has excellent light resistance. Accordingly, it is considered that the composition of the invention exhibits original high heat resistance and transparency of the silicone resin, and also has excellent adhesiveness.

The composition for thermosetting silicone resin of the invention includes the (1) dual-end silanol type silicone resin represented by the above-mentioned formula (I), the (2) trialkoxysilane and the (3) condensation catalyst.

(1) Dual-End Silanol Type Silicone Resin

From the viewpoint of compatibility with the respective components, the dual-end silanol type silicone resin in the invention is a compound represented by formula (I):

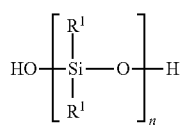

(I)

in which $R^1$ represents a monovalent hydrocarbon group, and n is an integer of 20 to 10,000, provided that all $R^1$ groups may be the same or different.

$R^1$ in formula (I) represents a monovalent hydrocarbon group. The hydrocarbon groups include saturated or unsaturated, straight-chain, branched or cyclic hydrocarbon groups. From the viewpoints of ease of preparation and thermal stability, the carbon number of the hydrocarbon group is preferably 1 to 20, more preferably 1 to 10. Specifically, there are exemplified a methyl group, an ethyl group, a propyl group, a butyl group, a pentyl group, a hexyl group, a phenyl group, a naphthyl group, a cyclohexyl group, a cyclopentyl group and the like. Above all, a methyl group is preferred from the viewpoints of transparency and light resistance. Incidentally, in formula (I), all $R^1$ groups may be the same or different. However, it is preferred that all are methyl groups.

Although n in formula (I) is an integer of 20 to 10,000, it is preferably an integer of 50 to 1,000, from the viewpoints of stability and handling properties in the semi-cured state.

Examples of such compounds represented by formula (I) include dual-end silanol type polydimethylsiloxanes, dual-end silanol type polymethylphenylsiloxanes and dual-end silanol type polydiphenylsiloxanes. These may be used either alone or as a combination of two or more thereof. Of these, preferred is a compound in which all $R^1$ groups are methyl groups and n is an integer of 50 to 1,000.

In the compound represented by formula (I), the molecular weight thereof is preferably from 100 to 1,000,000, and more preferably from 3,000 to 300,000, from the viewpoints of stability and handling properties in the semi-cured state. Incidentally, in this specification, the molecular weight of the silicone derivative is measured by gel filtration chromatography (GPC).

The content of the dual-end silanol type silicone resin, that is to say, the content of the compound represented by formula (I), is preferably from 1 to 99.99% by weight, more preferably from 50 to 99.99% by weight, and still more preferably from 80 to 99.99% by weight, based on the total amount of the silicone derivatives in the composition.

(2) Trialkoxysilane

There is no particular limitation on the trialkoxysilane in the invention. However, from the viewpoint of compatibility with the respective components, a compound represented by formula (II) is preferred:

(II)

in which $R^2$ represents a monovalent organic group, and $X^1$ represents an alkoxy group, provided that three $X^1$ groups may be the same or different.

$R^2$ in formula (II) represents an organic group, and the carbon number thereof is preferably from 1 to 20 and more preferably from 1 to 10, from the viewpoints of ease of preparation and thermal stability. Specifically, there are exemplified a methyl group, an ethyl group, a propyl group, a butyl group, a pentyl group, a hexyl group, a phenyl group, a naphthyl group, a cyclohexyl group, a cyclopentyl group, a vinyl group, an allyl group, a propenyl group, a butenyl group, a pentenyl group, a hexenyl group, a styryl group, a norbornenyl group, a 2-(3,4)-epoxycyclohexylethyl group, a 3-glycidoxypropyl group, a 3-methacryloxypropyl group, a 3-acryloxypropyl group, an N-2-(aminoethyl)-3-aminopropyl group, a 3-aminopropyl group, an N-phenyl-3-aminopropyl group, a 3-ureidopropyl group, a 3-chloropropyl group, a 3-mercaptopropyl group, a 3-isocyanatepropyl group and the like. Above all, a vinyl group and a 3-glycidoxypropyl group are preferred from the viewpoints of reactivity to the condensation reaction and adhesiveness of the resin.

$X^1$ in formula (II) represents an alkoxy group. From the viewpoints of stability and handling properties, preferred are a methoxy group, an ethoxy group, a propoxy group, a butoxy group and a cyclohexyloxy group, and more preferred is a methoxy group. Incidentally, in formula (II), three $X^1$ groups may be the same or different. However, it is preferred that all are methoxy groups.

Examples of such compounds represented by formula (II) include vinyltriethoxysilane, vinyltrimethoxysilane, methyltrimethoxysilane, 3-glycidoxypropyltrimethoxysilane, 3-methacryloxypropyltrimethoxysilane, 3-aminopropyltrimethoxysilane and 3-mercaptopropyltrimethoxysilane. These can be used either alone or as a combination of two or more thereof. Of these, preferred are vinyltrimethoxysilane in which $R^2$ is a vinyl group and all $X^1$ groups are methoxy groups and 3-glycidoxypropyltrimethoxysilane in which $R^2$ is a 3-glycidoxypropyl group and all $X^1$ groups are methoxy groups.

The total content of the compounds represented by formula (II) in the trialkoxysilane is preferably 50% by weight or more, more preferably 80% by weight or more and still more preferably substantially 100% by weight.

The total content of the trialkoxysilanes is preferably from 0.01 to 99% by weight, more preferably from 0.01 to 50% by weight, and still more preferably from 0.01 to 20% by weight, based on the total amount of the silicone derivatives contained in the composition.

Further, the total content of the trialkoxysilanes is preferably from 0.01 to 10 parts by weight, and more preferably from 0.1 to 5 parts by weight, based on 100 parts by weight of the dual-end silanol type silicone resin, from the viewpoint of strength of the resulting cured product.

Furthermore, the weight ratio of the dual-end silanol type silicone resin and the trialkoxysilane is as follows. That is to say, from the viewpoint of allowing SiOH groups of the dual-end silanol type silicone oil and $SiX^1$ groups of the trialkoxysilane to react with each other in just proportion, the molar ratio (SiOH/SiX$^1$) of the above-mentioned functional groups is preferably from 20/1 to 0.2/1, more preferably from 10/1 to 0.5/1, and still more preferably substantially equivalent (1/1). In the case where the above-mentioned molar ratio is 20/1 or less, a semi-cured product having moderate toughness is obtained when the composition of the invention is semi-cured. On the other hand, in the case where it is 0.2/1 or more, the trialkoxysilane does not become too much, resulting in good heat resistance of the resulting resin.

(3) Condensation Catalyst

There is no particular limitation on the condensation catalyst in the invention, as long as it is a compound which catalyzes the condensation reaction of the silanol groups of the dual-end silanol type silicone resin and alkoxysilyl groups of the trialkoxysilane. However, from the viewpoints of compatibility and thermal degradability, tetramethylammonium hydroxide is preferred.

Tetramethylammonium hydroxide is a compound showing alkalinity, but largely decreases in alkalinity when decomposed at 130 to 140° C. Accordingly, the alkali content decreases, for example, in the resin after thermally cured at 150° C. On the other hand, the silicone resin is generally liable to be thermally decomposed by a catalytic action of an acid, an alkali, a metal or the like incorporated as a curing catalyst. However, tetramethylammonium hydroxide has the above-mentioned characteristic, so that it can be suitably used as the condensation catalyst.

In the invention, the condensation catalysts other than tetramethylammonium hydroxide can also be used. As the other condensation catalysts, there are exemplified acids such as hydrochloric acid, acetic acid, formic acid and sulfuric acid; bases such as potassium hydroxide, sodium hydroxide and potassium carbonate; and metal catalysts such as aluminum, titanium, zinc and tin. The content of tetramethylammonium hydroxide in the condensation catalyst is preferably 20% by weight or more, more preferably 50% by weight or more, and still more preferably substantially 100% by weight.

The content of the condensation catalyst in the composition is preferably from 0.01 to 50 moles, and more preferably from 0.1 to 5 moles, based on 100 moles of the dual-end silanol type silicone resin.

The composition for thermosetting silicone resin of the invention may contain additives such as an aging inhibitor, a modifying agent, a surfactant, a dye, a pigment, a discoloration preventing agent and an ultraviolet absorber, in addition to the above, within the range not impairing the effects of the invention.

The composition for thermosetting silicone resin of the invention can be prepared without any particular limitation, as long as the composition includes the (1) dual-end silanol type silicone resin, the (2) trialkoxysilane and the (3) condensation catalyst. Specifically, the composition can be prepared by stirring the (1) dual-end silanol type silicone resin, the (2) trialkoxysilane, the (3) condensation catalyst and optionally the above-mentioned additives and an organic solvent, preferably at 0 to 100° C. for 5 minutes to 24 hours.

There is no particular limitation on the organic solvent. However, 2-propanol is preferred from the viewpoint of enhancing compatibility of the silicone derivative and the condensation catalyst. The existing amount of the organic solvent is preferably from 3 to 100 parts by weight, and more preferably from 5 to 20 parts by weight, based on 100 parts by weight of the total amount of the dual-end silanol type silicone resin and the trialkoxysilane. When the existing amount thereof is 3 parts by weight or more, the reaction proceeds satisfactorily, whereas when it is 100 parts by weight or less, foaming of the composition in the curing step is reduced.

Further, the composition for thermosetting silicone resin of the invention can be formed into a sheet shape by applying the composition as it is or an organic solvent solution of the composition, for example, onto a release sheet (for example, a polyethylene substrate) whose surface is release treated, to an appropriate thickness by a method such as casting, spin coating or roll coating, followed by drying by heating at such a temperature that the solvent is removable. The heating temperature cannot be completely determined depending on the kind of solvent used. However, according to the composition of the invention, in addition to the removal of the solvent, the condensation reaction is performed by this heating, thereby being able to prepare a silicone adhesive sheet. Accordingly, the invention also provides the silicone adhesive sheet obtained by semi-curing the composition for thermosetting silicone resin of the invention.

The heating temperature is preferably from 20 to 200° C., and more preferably from 40 to 150° C. The heating time is preferably from 0.1 to 60 minutes, and more preferably from 1 to 20 minutes.

The silicone adhesive sheet of the invention is in the semi-cured state, so that an optical semiconductor device can be prepared, for example, by laminating the sheet as it is on a substrate of the optical semiconductor device on which LEDs are mounted, further laminating an encapsulation resin sheet or the like thereon, and completely curing the adhesive sheet by heating at high temperature.

EXAMPLES

The invention will be described below with reference to examples and a comparative example, but is not construed as being limited thereto.

Molecular Weight of Silicone Derivative

The molecular weight is determined in terms of polystyrene by gel filtration chromatography (GPC).

Example 1

A composition for silicone resin having a composition shown in Table 1 is obtained. Specifically, a hundred grams (8.70 mmol) of a dual-end silanol type silicone resin (a compound in which all R$^1$ groups is represented by methyl groups, and n is 155, in formula (I), average molecular weight: 11,500), as a trialkoxysilane, 0.86 g (5.80 mmol) of vinyltrimethoxysilane (a compound in which R$^2$ is represented by a vinyl group, and all X$^1$ groups are represented by methoxy groups, in formula (II)) (in which the ratio (SiOH/SiX$^1$) of the number of moles of SiOH groups of the dual-end silanol type silicone resin and the total number of moles of SiX$^1$ groups of the trialkoxysilane=1/1), and as an organic solvent, 10 ml (7.7 parts by weight based on 100 parts by weight of the total amount of the dual-end silanol type silicone resin and the trialkoxysilane) of 2-propanol were mixed by stirring, and then, 0.16 ml (catalytic amount: 0.18 mmol, 2.0 moles based on 100 moles of the dual-end silanol type silicone resin) of a methanol solution of tetramethylammonium hydroxide (concentration: 10% by weight) was added thereto as a condensation catalyst, followed by stirring at room temperature (25° C.) for 1 hour. Thereafter, the mixture was allowed to stand for 16 hours to obtain the composition for silicone resin.

Example 2

A composition for silicone resin was obtained in the same manner as in Example 1 with the exception that a mixture of 0.77 g (5.20 mmol) of vinyltrimethoxysilane and 0.14 g (0.59 mmol) of (3-glycidoxypropyl)trimethoxysilane (a compound in which $R^2$ is represented by a 3-glycidoxypropyl group, and all $X^1$ groups are represented by methoxy groups, in formula (II)) was used instead of using 0.86 g (5.8 mmol) of vinyltrimethoxysilane. Incidentally, the molar ratio (SiOH/SiX$^1$) was 1/1.

Example 3

A composition for silicone resin was obtained in the same manner as in Example 1 with the exception that 1.4 g (5.9 mmol) of (3-glycidoxypropyl)trimethoxysilane was used instead of using 0.86 g (5.8 mmol) of vinyltrimethoxysilane. Incidentally, the molar ratio (SiOH/SiX$^1$) was 1/1.

Example 4

A composition for silicone resin was obtained in the same manner as in Example 1 with the exception that the amount of the methanol solution of tetramethylammonium hydroxide (concentration: 10% by weight) used was changed from 0.16 ml (catalytic amount: 0.18 mmol) to 0.32 ml (catalytic amount: 0.36 mmol, 4.0 moles based on 100 moles of the dual-end silanol type silicone resin).

Comparative Example 1

A composition for silicone resin was obtained in the same manner as in Example 1 with the exception that 8.7 g (8.70 mmol) of a dual-end silanol type silicone resin (a compound in which all $R^1$ groups is represented by methyl groups, and n is 13, in formula (I), average molecular weight: 1,000) was used instead of using 100 g (8.70 mmol) of the dual-end silanol type silicone resin (the compound in which all $R^1$ groups is represented by methyl groups, and n is 155, in formula (I), average molecular weight: 11,500).

Preparation Example 1 of Semi-Cured Product

Each of the compositions of Examples 1 to 4, Comparative Example 1 and Reference Example 1 was applied on a sheet having a thickness of 100 μm and prepared from the two-liquid mixing type silicone elastomer (manufactured by Wacker Asahikasei Silicone Co., Ltd., a heat-curing type high-viscosity product), to a thickness of 500 μm or 300 μm. Then, the compositions of Examples 1 to 4 and Comparative Example 1 were heated at 80° C. for 20 minutes, and the composition of Reference Example 1 was allowed to stand at room temperature (25° C.) for 16 hours, thereby preparing sheet-like semi-cured products (sheets).

Preparation of Completely Cured Product

For the sheets obtained above, the sheets of Examples 1 to 4 and Comparative Example 1 were heated at 150° C. for 5 hours, and the sheet of Reference Example 1 was heated at 150° C. for 1 hour, thereby preparing completely cured products.

For the semi-cured products and completely cured products obtained, characteristics were evaluated according to the following Test Examples 1 to 4. The results thereof are shown in Table 2.

Test Example 1

Storage Stability

When a load of 7 g/mm$^2$ was applied to the semi-cured product immediately after the preparation and after the storage at room temperature (25° C.) for 24 hours by a sensor head using a digital length measuring meter (MS-5C, manufactured by Nikon Corporation), the distance the sensor head sank from a surface of the semi-cured product was measured, and the sheet hardness was determined based on the following equation:

Sheet hardness=[1−(the distance (μm) the sensor head sank/the film thickness (μm) of the semi-cured product)]×100

TABLE 1

|  |  | Example 1 | Example 2 | Example 3 | Example 4 | Comparative Example 1 |
|---|---|---|---|---|---|---|
| Composition | (1) Dual-End Silanol Type Silicone Resin | Compound in which all $R^1$ groups are methyl, n = 155, in formula (I) | Compound in which all $R^1$ groups are methyl, n = 155, in formula (I) | Compound in which all $R^1$ groups are methyl, n = 155, in formula (I) | Compound in which all $R^1$ groups are methyl, n = 155, in formula (I) | Compound in which all $R^1$ groups are methyl, n = 13, in formula (I) |
|  | (2) Trialkoxysilane | Vinyltrimethoxysilane | Vinyltrimethoxysilane 3-GPTMS | 3-GPTMS | Vinyltrimethoxysilane | Vinyltrimethoxysilane |
|  | (3) Condensation Catalyst | TMAH | TMAH | TMAH | TMAH | TMAH |
| (2) Content[1] |  | 0.86 | 0.91 | 1.4 | 0.86 | 0.86 |
| (3) Content[2] |  | 2 | 2 | 2 | 4 | 2 |
| SiOH/SiX$^1$ [3] |  | 1/1 | 1/1 | 1/1 | 1/1 | 1/1 |

3-GPTMS: 3-Glycidoxypropyltrimethoxysilane
TMAH: Tetramethylammonium hydroxide
[1] The content shows the total content (parts by weight) of the trialkoxysilane based on 100 parts by weight of the dual-end silanol type silicone resin.
[2] The content shows the content (moles) based on 100 moles of the dual-end silanol type silicone resin.
[3] SiOH/SiX$^1$ shows the ratio (SiOH/SiX$^1$) of the SiOH content of the dual-end silanol type silicone resin and the total amount of SiX$^1$ groups of the trialkoxysilane.

Using the compositions obtained, semi-cured products and completely cured products were prepared according to the following method. Incidentally, 10 g of liquid A and 10 g of liquid B of a commercially available two-liquid mixing type silicone elastomer (manufactured by Wacker Asahikasei Silicone Co., Ltd., a heat-curing type high-viscosity product) were thoroughly mixed to prepare a composition for silicone resin (viscosity at 25° C.: 15,000 mPa·s), and a semi-cured product and a completely cured product were similarly prepared as Reference Example 1.

Then, the ratio of the resulting sheet hardnesses [(after the storage/immediately after the preparation)×100] was taken as the hardness maintaining ratio (%), and storage stability was evaluated according to the following evaluation criteria:

Evaluation Criteria of Storage Stability

A: the hardness maintaining ratio was more than 95% or less than 105%.

B: the hardness maintaining ratio was from 80 to 95% or from 105 to 120%.

C: the hardness maintaining ratio was less than 80% or more than 120%.

Test Example 2

Transparency

The light transmittance (%) of each completely cured product at a wavelength of 450 nm was measured by using a spectrophotometer (U-4100, manufactured by Hitachi High-Technologies Corporation). The higher light transmittance shows the more excellent transparency.

Test Example 3

Heat Resistance

Each completely cured product was allowed to stand still in a hot air type dryer of 150° C., and the appearance of the completely cured product after an elapse of 100 hours was visually observed. The case where no change in color from a state before storage was observed was evaluated as "A", and the case where a change in color was observed was evaluated as "B". Further, each completely cured product was allowed to stand still in a hot air type dryer of 200° C., and the weight thereof after an elapse of 24 hours divided by the weight thereof before storage was taken as the residual ratio (%). No change in appearance after storage and the higher residual ratio show the more excellent heat resistance.

Test Example 4

Adhesiveness

Each semi-cured product was laminated on a silicon wafer or a PET film, pressed at a pressure of 0.2 MPa for 5 minutes, while heating at 160° C. under reduced pressure, and then, heated at 150° C. for 5 hours to prepare a cured product. For the resulting cured product, the peel force thereof was measured according to a 180° peel test. The higher peel force shows the more excellent adhesiveness.

Incidentally, the present application is based on Japanese Patent Application No. 2009-193103 filed on Aug. 24, 2009, and the contents are incorporated herein by reference.

Also, all the references cited herein are incorporated as a whole.

The composition for thermosetting silicone resin of the invention can be suitably used, for example, at the time of producing semiconductor elements of backlights of liquid crystal screens, traffic signals, outdoor large-sized displays, advertising signs and the like.

What is claimed is:

1. A silicone adhesive sheet comprising a silicone adhesive layer comprising the composition for thermosetting silicone resin on a substrate, wherein the composition comprises: (1) a dual-end silanol type silicone resin represented by formula (I):

wherein $R^1$ represents a monovalent hydrocarbon group, and n is an integer of 20 to 10,000, provided that all $R^1$ groups may be the same or different;

(2) a trialkoxysilane; and (3) a condensation catalyst comprises tetramethylammonium hydroxide, wherein a molar ratio of the SiOH groups of the dual-end silanol type silicone resin to the Si-alkoxy groups of the trialkoxysilane is 20/1 to 0.2/1, wherein the sheet is in a semi-cured state, and wherein the substrate is a release sheet.

TABLE 2

|  |  |  | Example 1 | Example 2 | Example 3 | Example 4 | Comparative Example 1 | Reference Example 1 |
|---|---|---|---|---|---|---|---|---|
| Semi-Cured Product | Storage Stability | Hardness Immediately after Preparation | 0.22 | 0.21 | 0.35 | 0.25 | 6.0 | 7.1 |
|  |  | Hardness after Storage | 0.23 | 0.22 | 0.40 | 0.30 | 9.6 | 19 |
|  |  | Hardness Maintaining Ratio | A | A | B | B | C | C |
| Completely Cured Product | Transparency | Light Transmittance (%) | 99 | 99 | 99 | 99 | 99 | 99 |
|  | Heat Resistance | Appearance | A | A | A | A | A | A |
|  |  | Residual Ratio (%) | 99 | 99 | 99 | 99 | 98 | 91 |
|  | Adhesiveness | Peel Force (Silicon Wafer, mN/cm$^2$) | 2590 | 2870 | 2330 | 1820 | 130 | 190 |
|  |  | Peel Force (PET Film, mN/cm$^2$) | 1050 | 900 | 890 | 700 | 210 | 80 |

The results show that the compositions of Examples can provide resins high in storage stability and excellent in all of transparency, heat resistance and adhesiveness, compared to the composition of Comparative Example.

While the invention has been described in detail with reference to specific embodiments thereof, it will be apparent to one skilled in the art that various changes and modifications can be made therein without departing from the spirit and scope thereof.

2. The silicone adhesive sheet according to claim 1, wherein the (2) trialkoxysilane is a compound represented by formula (II):

$$R^2\text{—Si}(X^1)_3 \quad (II)$$

wherein $R^2$ represents a monovalent organic group, and $X^1$ represents an alkoxy group, provided that three $X^1$ groups may be the same or different.

* * * * *